Oct. 26, 1965 R. J. GOUNTANIS ETAL 3,214,739

DUPLEX OPERATION OF PERIPHERAL EQUIPMENT

Filed Aug. 23, 1962 6 Sheets-Sheet 1

INVENTORS
ALBERT J. HEIDEMAN
ROBERT J. GOUNTANIS
BY Griffin and Stokes
ATTORNEYS Oct. 26, 1965 R. J. GOUNTANIS ETAL 3,214,739

DUPLEX OPERATION OF PERIPHERAL EQUIPMENT

Filed Aug. 23, 1962 6 Sheets-Sheet 3

Oct. 26, 1965 R. J. GOUNTANIS ETAL 3,214,739

DUPLEX OPERATION OF PERIPHERAL EQUIPMENT

Filed Aug. 23, 1962 6 Sheets-Sheet 5

Oct. 26, 1965 R. J. GOUNTANIS ETAL 3,214,739

DUPLEX OPERATION OF PERIPHERAL EQUIPMENT

Filed Aug. 23, 1962 6 Sheets-Sheet 6

United States Patent Office 3,214,739
Patented Oct. 26, 1965

3,214,739
DUPLEX OPERATION OF PERIPHERAL EQUIPMENT

Robert J. Gountanis, Mendota Heights, and Albert John Heideman, St. Paul, Minn., assignors to Sperry Rand Corporation, New York, N.Y., a corporation of Delaware Filed Aug. 23, 1962, Ser. No. 219,015
23 Claims. (Cl. 340—172.5)

The present invention relates to a duplex system whereby a peripheral unit can be physically connected to at least two data processing means only one of which can have control over the peripheral unit at any given time in accordance with duplexing control signals.

For most, if not all data processing systems, peripheral input/output gear is required to enter data into and receive data from the actual computing circuits. Such peripheral units may take many forms such as magnetic tape transports, card readers, line printers, and the like. However, for most applications the duty cycle of such peripheral units is much less than 100 percent due to the time required for the computer to process the supplied information before results are obtained. Therefore, a peripheral unit may stand idle for much of the time during which its associated data processor is in operation.

In order to take advantage of such idle time, prior art systems have been able to utilize the same external gear on a time-sharing basis with two data processors. In such system, a predetermined allocated time period is set aside for use of the same external unit by each processor which in turn is generally operated from common clock signals. Thus, for a data processor A and a data processor B, it may be customary to allocate predetermined input/output periods A and B one for each of the two processors, during which time a processor is allowed to communicate its need for input data or the like. Since each data processor can only gain control of the external unit during this predetermined time, this decreases the flexibility of the data processor in that it may be necessary for it to halt internal operations until the time arrives when it can receive or transmit data.

The present invention is concerned with a duplexing scheme for at least two asynchronously operating data processing units whereby a piece of peripheral gear standing idle can be utilized by either on a non-interfering basis. External function commands are used to implement this computer duplex mode. Actually, this mode is applicable to two or more computers in a data processing complex which are connected by communication links to a peripheral unit that employs duplexing. Such peripheral equipment utilizes only three basic commands from the computer for duplexing purposes.

Therefore, one object of the present invention is to provide an arrangement for permitting at least two asynchronously operating computers to utilize the output capabilities of the same piece of peripheral gear with resulting economy.

Another object of the invention is to control a peripheral device from at least two asynchronously operating computer sources on a non-interfering basis via external function signals from the computers.

A further object of the present invention is to provide circuitry for a peripheral unit which receives and acts upon a request for control by one of several data processing means.

Still another object of the present invention is to provide circuitry for a peripheral unit which is responsive to commands from one of several data processing means in order to both initiate and terminate communication between the unit and said data processor.

These and other objects of the present invention will become apparent during the course of the following description, which should be read with particular reference to the drawings in which.

Figure 6:
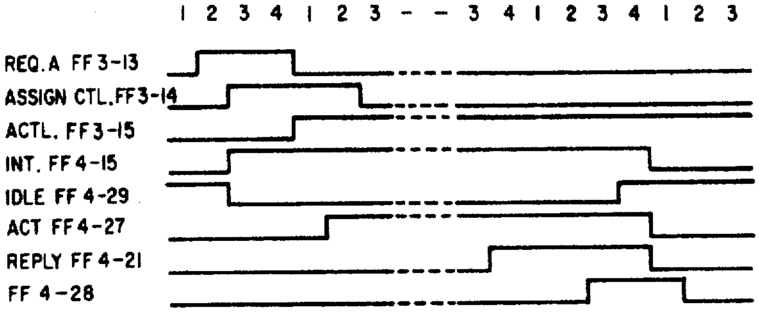
Figure 7:
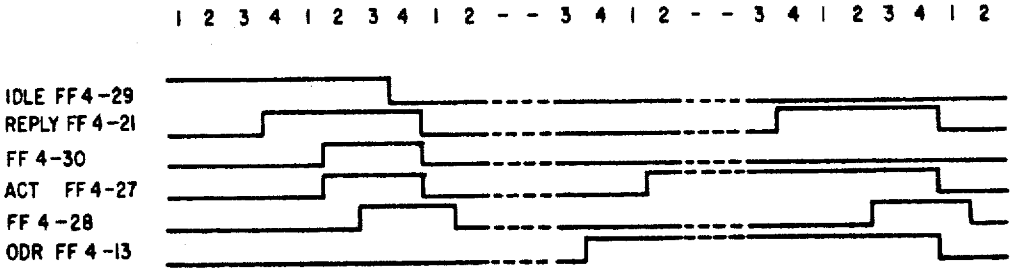
Figure 4A:
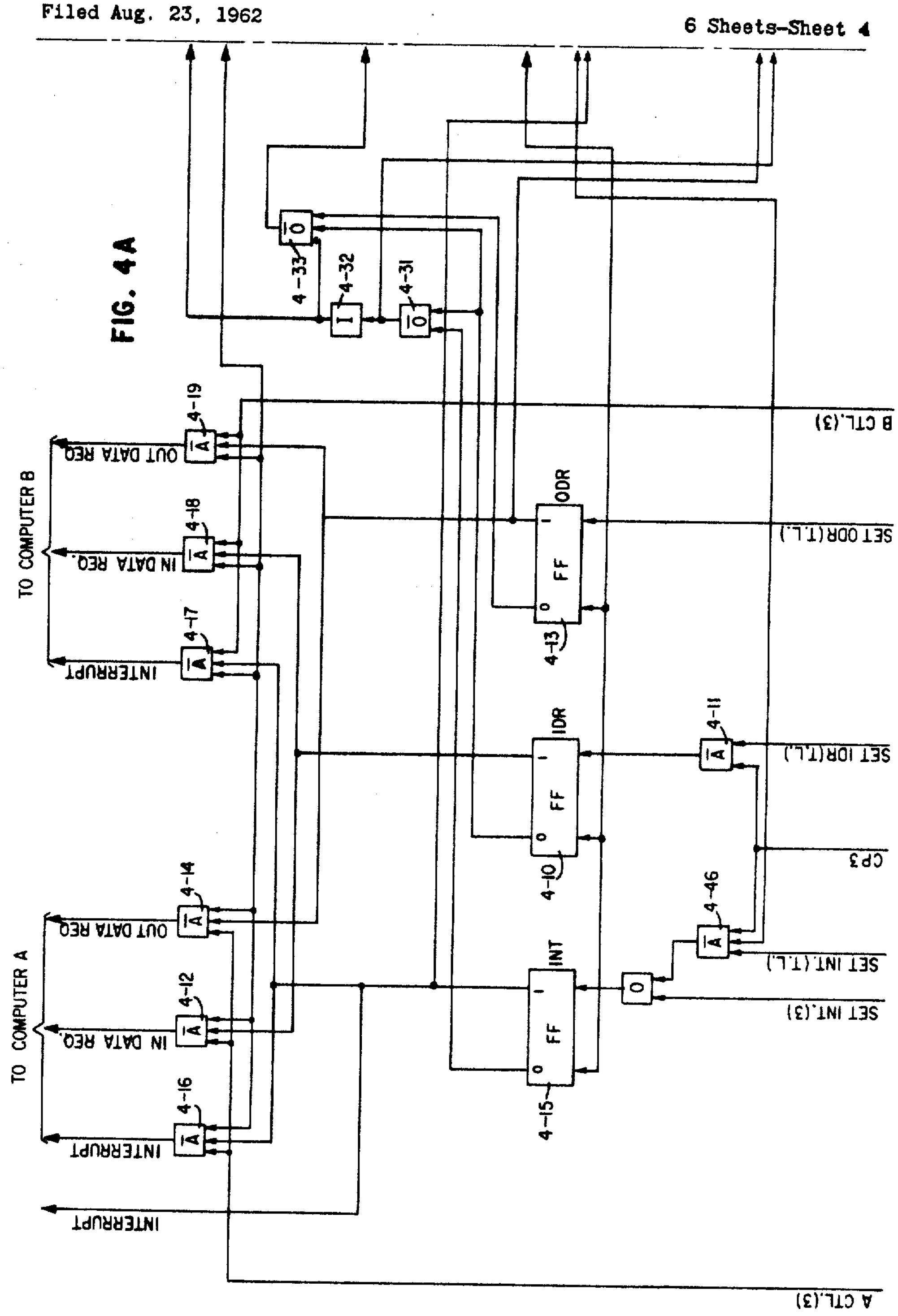
Figure 4B:
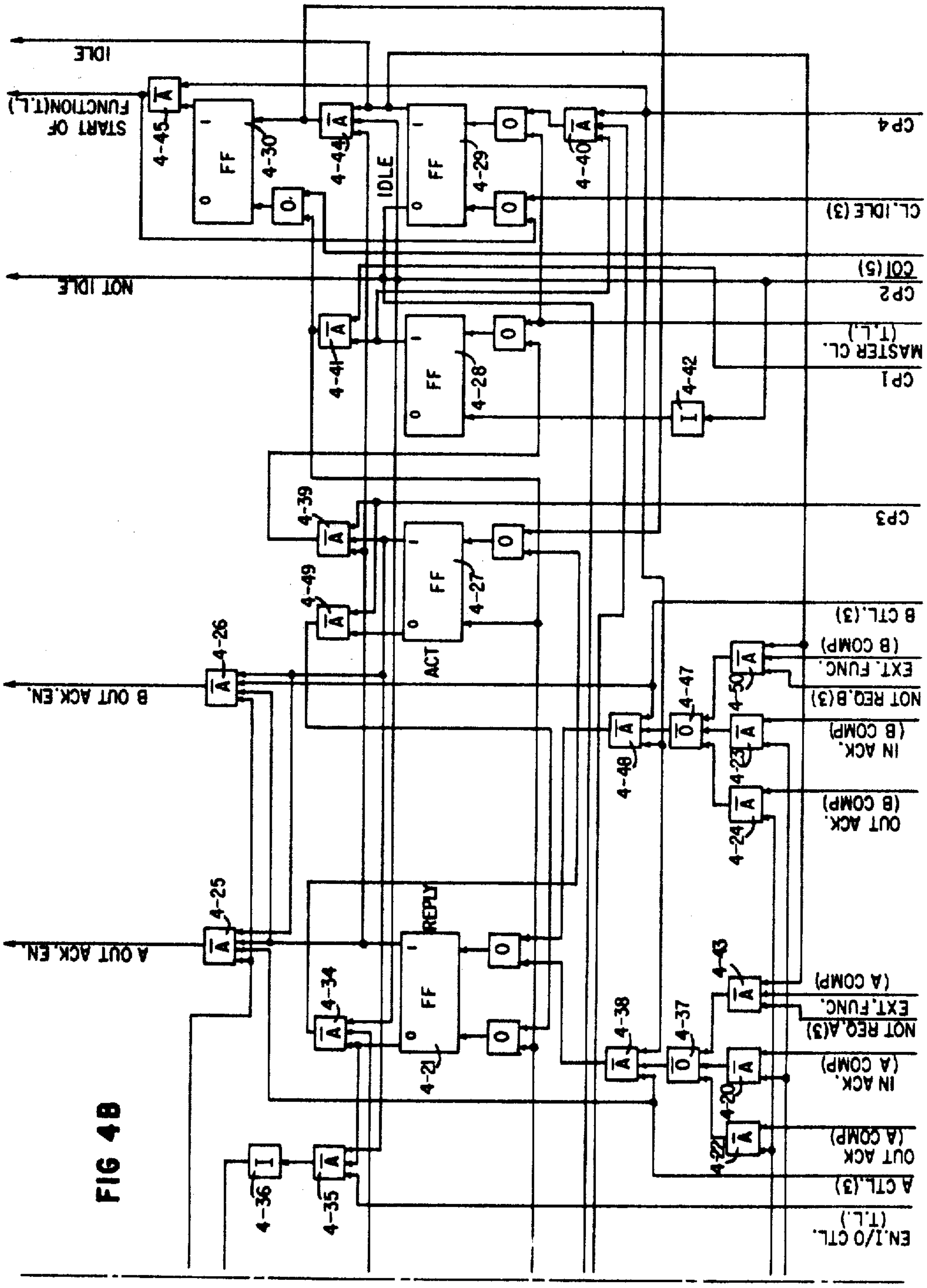
Figure 5:
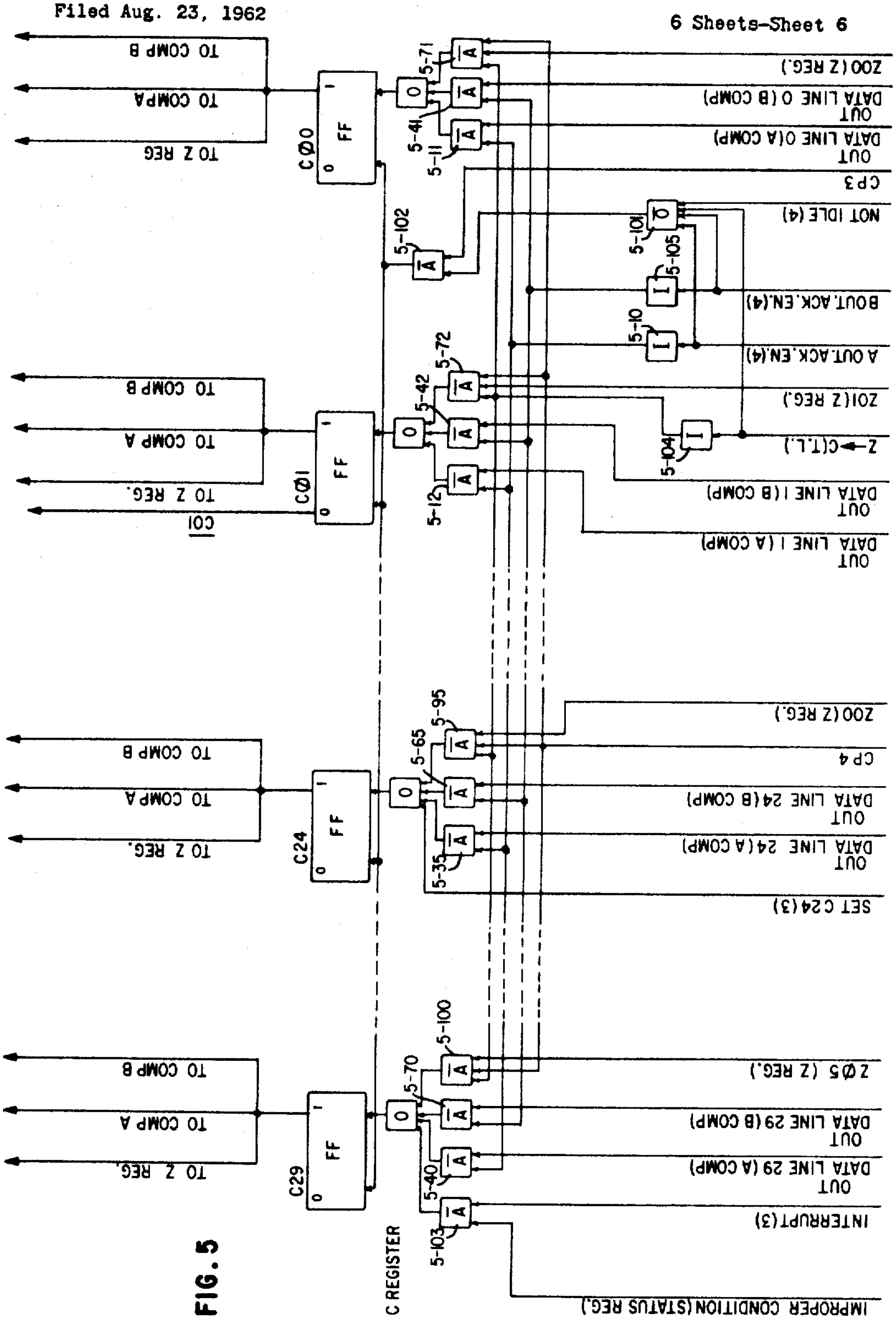

FIGURES 4a and 4b taken together is a detailed logic schematic illustrating how the communication link between the external unit and the controlling computer is completed;

FIGURE 5 shows a part of the buffer register through which information passes between the controlling computer and the external unit; and FIGURES 6 and 7 are timing diagrams used in explaining the operation of the present invention.

In the figures, several basic and well known logic components are represented in block form having the following functions. $\overline{A}$ identifies a AND-inverter circuit whose output is low only when all of its inputs are high. This same circuit can also be used to detect the presence of any low input signal, for which its output is high, and is alternatively given the designation $\overline{O}$ when employed in this manner. The letter I shows an inverting function, while the letter O merely represents a buffer connection without change of signal polarity. A bistable flip-flop element FF is employed having 0 and 1 output terminals. A low input signal to its 0 side causes the flip-flop to be cleared such that a high signal appears from its 0 output and a low signal appears from its 1 output. Conversely, a low input to its 1 side results in the flip-flop being switched to its set state with a reversal of output polarities. Each component is identified by a hyphenated number whose leftmost digit indicates the figure in which said component is shown. Input signals or commands to a figure are abbreviated and have their origin specified by a figure number or unit abbreviation enclosed by parentheses.

Figure 1:
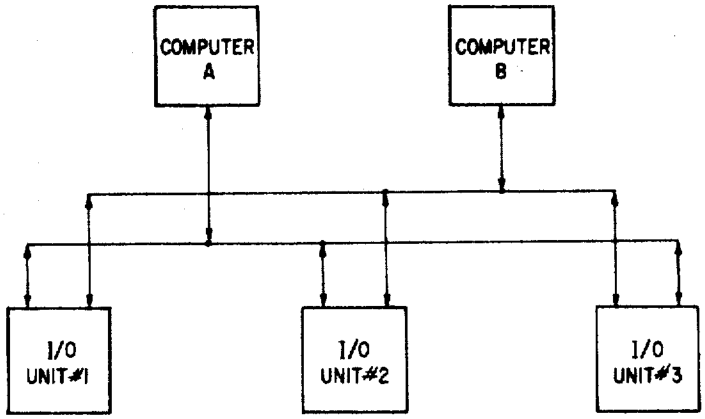
FIGURE 1 illustrates in block form a data processing complex employing the present invention.

FIGURE 1 shows a typical computer complex in which the present invention finds particular use. Two computers or data processors A and B operate in dependently of one another each with its own master clock and timing signals. One or more input/output units 1, 2 and 3 may be provided for the complex in order to provide communication with the computers. The units may be all of the same type, or alternatively each can perform a different function. For example, I/O unit 1 might be a tape transport, I/O unit 2 an output line printer, and I/O unit 3 a card reader input. If computer A desires communication with I/O unit 1, it requests control thereof which is given immediately if the unit is standing idle. On the other hand, if computer B is in the midst of communicating with the unit by the time that computer A requests control, said control must be denied until communication with computer B has ceased. Each peripheral unit contains a duplexing circuit, which is the subject matter of the present invention, for insuring that only one computer can communicate with the unit at any given time. This duplexing circuit also interprets a request for control from a computer to determine if the request can be met. Thus, this logic is designed to allow either computer to take control of the unit immediately if it is not in use, or as soon as it is available if it is already under control of the other computer. Provision is also made for one computer to take control away from the other if circumstances such as computer malfunction warrant such a drastic step.

Figure 2:
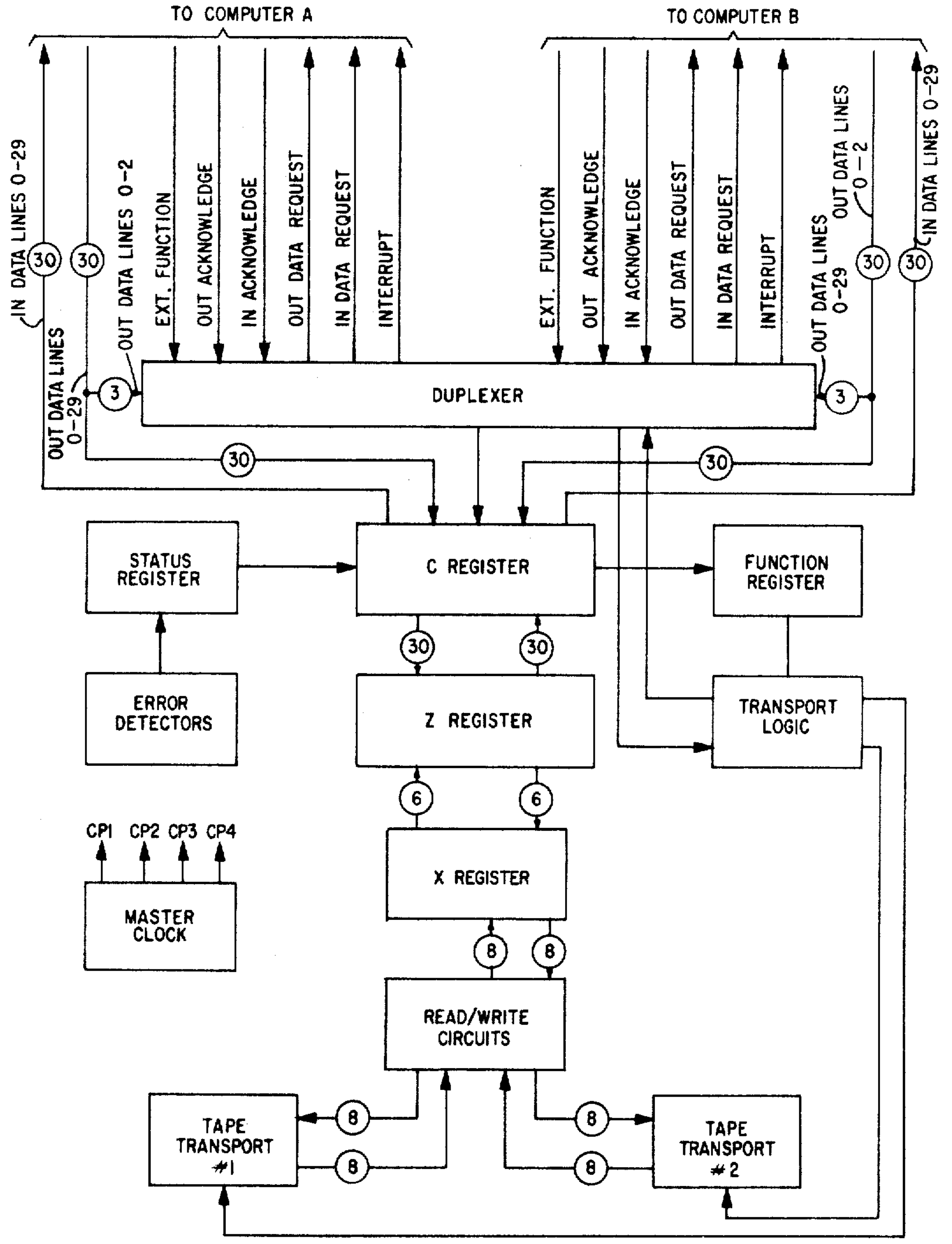
FIGURE 2 shows the organization, in block form, of a typical external unit in which the invention is incorporated.

FIGURE 2 shows the organization of a typical external unit such as a magnetic tape transport. Actually, two transports numbered 1 and 2 are part of this unit either of which can be selected during the read-write operation. A communication link is provided between the external unit and each computer which consists of both data and control channels. In the following discussion, the terms "input" and "output" refer to directions of communication to and from a computer, respectively. Thus, in a particular installation such as shown in FIGURE 2, there are thirty input data lines numbered 0 through 29 and thirty output data lines numbered 0 through 29 for each computer. Each group of input or output data lines can carry a 30-bit parallel word. The communication between the external unit and either one of the computers is via the C register which in turn contains thirty stages C00 through C29 and associated gates. It will be seen that the input data and output data lines provided for each computer all feed into the C register which, however, can accept or transmit data to only one of the computers at a time. The output data lines from each computer are also employed to convey external function code words from the computer which are interpreted by the unit in order to control its particular function, such as read, write, rewind, etc. After the controlling computer puts a function code word into the C register, it is translated by the function register. A transport control logic is provided which determines if the specified tape transport can perform the function requested by the external function code word. If the function is legal, tape motion is initiated; if not, transport control informs error circuits that an improper condition exists so that the function cannot be executed.

The Z register is a thirty-bit shift register used in disassembling computer data words for writing on tape and for reassembling them when read back from tape. In write operations, it receives thirty-bit data words from C register and sends output word segments to the X register; in read operations the Z register accepts word segments from the X register and reassembles them into complete thirty-bit words in C. Thus, the functions of the X register vary with read and write modes and with the format in use. Read-write circuits are connected with the X register in order to either place a character onto the tape at the selected transport, or to receive a character therefrom for eventual reassembling into a thirty-bit computer data word by the Z register.

Error detection circuits are also provided for detecting timing errors, synchronization errors, parity errors, or improper conditions. This information is stored temporarily for use in the status register whose content is sent to the C register and from thence to the controlling computer in order to inform the computer of malfunctions. Also shown in FIGURE 2 is a master clock, generating clock phase signals 1, 2, 3, and 4 in order to time the various operations occurring in the peripheral unit. This master clock, however, operates entirely independent of the master clock in each of the computers A and B.

The present invention is concerned with a duplexing circuit which permits the external unit to be used with more than one computer on a non-interfering basis. Peripheral equipment employing computer duplexing contains logic circuitry which enables it to interpret duplexing control signals. Duplexing control codes are contained in the lower three bits of an External Function word which is transferred on the output data lines of a computer. These codes, in conjunction with the Control Acknowledge Interrupt which is generated by the peripheral equipment, are the only codes required for performance of the computer duplexing function. A computer program, by enabling the transmission of External Function codes and by evaluating external interrupts, determines if the computer control and data lines are fully enabled for communication with the peripheral equipment. The method used for performing computer duplexing allows a peripheral unit to be in one of three conditions at any given time. By designating the two computers in a complex as originating (or local) computer and other (or remote) computer, the peripheral equipment can be described by one of the three following conditions: (1) under control of originating computer; (2) under control of other computer; and (3) under control of neither computer.

Duplex circuitry of peripheral equipment interprets three of the External Function commands which are sent to it. These three External Function codes use bit-position coding as shown below. The following descriptions illustrate the actions that take place when the "duplex control" External Function codes are received by a peripheral equipment.

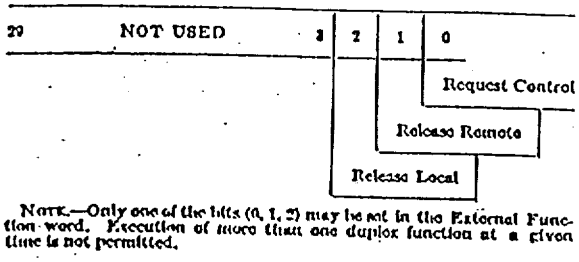

NOTE.—Only one of the bits (0, 1, 2) may be set in the External Function word. Execution of more than one duplex function at a given time is not permitted.

The Request Control External Function code word is sent by a computer at the time it desires control of the peripheral equipment. This word has a 1 bit in position 0 (Out Data Line 0), 0 bits in positions 1 and 2 (Out Data Lines 1 and 2), and bits of any value in positions 3–29. One of the following situations will exist at this time:

(1) Originating computer in control—The Request Control External code is ignored; therefore, originating computer retains control and normal data communications may continue.

(2) Other computer in control—Duplex circuitry of the peripheral equipment stores the Request Control External Function code until other computer releases control and the equipment reaches a logical termination point. When other computer does release control and the equipment reaches a logical termination point, a Control Acknowledge Interrupt is sent to originating computer. Normal data communications may be established as soon as the Control Acklowledge Interrupt is received and interpreted by originating computer.

(3) Neither computer in control—The peripheral equipment responds with a Control Acknowledge Interrupt; originating computer may then establish normal data communications. If the peripheral equipment receives Request Control codes from both computers simultaneously when neither computer is in control, only one will receive control; the second computer's Request Control code will be stored.

When the Request Control External Function command is actually executed in the duplex circuitry of the peripheral equipment, the following are accomplished:

(1) The following lines between originating computer and the peripheral equipment are enabled:

(a) Input and Output Data Request lines
(b) Interrupt line
(c) All 30 Output Data lines into C register
(d) Input and Output Acknowledge lines.

(2) A Control Acknowledge Interrupt is transmitted to originating computer.

(3) The following lines between other computer and the peripheral equipment are prevented from being enabled:

(a) Input and Output Data Request lines
(b) Interrupt line
(c) All 30 Output Data lines into C register
(d) Input and Output Acknowledge lines.

(4) When items (1) through (3) have been accomplished, storage of the Request Control code is terminated.

The release Local External Function code is sent by a Controlling computer when the peripheral equipment being used is to be released. This word has 0 bits in positions 0 and 1, a 1 bit in position 2, and bits of any value in positions 3–29. The Release Local External Function code is not stored in the peripheral equipment but is performed upon receipt by the peripheral equipment. One of the following situations will exist at the time the Release Local External Function code is sent by the computer:

(1) Originating computer in control—If the peripheral equipment has completed performance of the last External Function code sent, it reverts to the neutral state and is not controlled by either computer. If the peripheral equipment is still performing the last External Function command, the Release Local External Function code is ignored.

(2) Other computer in control—The peripheral equipment ignores the Release Local code.

(3) Neither computer in control — The peripheral equipment ignores the Release Local External Function code.

When executed, the Release Local External Function code accomplishes the following in the peripheral equipment:

(1) The following lines between originating computer and the peripheral equipment are disabled:

(a) Input and Output Data Request Lines
(b) Interrupt line
(c) All 30 Output Data lines into C register
(d) Input and Output Acknowledge lines.

(2) It provides an enable that allows any future or previously stored Request Control signal from the other computer to enable the following lines between other computer and the peripheral equipment:

(a) Input and Output Data Request lines
(b) Interrupt line
(c) All 30 Output Data lines into C register
(d) Input and Output Acknowledge lines.

The Release Remote External Function code is sent by a computer to free the peripheral equipment from control of other computer. This word has a 1 bit in position 1, 0 bits in positions 0 and 2, and bits of any value in positions 3–29. The Release Remote External Function command is performed upon receipt by the peripheral equipment and is not stored therein. The Release Remote External Function code is not the normal method of placing a peripheral equipment in a neutral state. When transmitted by the noncontrolling computer, it is immediately acted upon and could possibly leave the computer that formerly controlled the peripheral equipment with active buffers but not effectively connected to the equipment. The Release Remote External Function code, therefore, has severe restrictions placed on its use. Its use is restricted to the unusual situation where the controlling computer is malfunctioning and is incapable of releasing control of the peripheral equipment. The use of Release Remote is defined by the Executive Control Program of the computer. One of the following situations will exist at the time the Release Remote External Function command is sent by the computer:

(1) Originating computer in control — The peripheral equipment ignores the Release Remote External Function code.

(2) Other computer in control — The peripheral equipment ceases all communication with other computer immediately upon receipt of the Release Remote code, and the peripheral equipment is placed in a neutral state. Originating computer must have sent a Request Control code previous to the Release Remote code and must receive the Control Acknowledge Interrupt in order to gain control.

(3) Neither computer in control — The peripheral equipment ignores the Release Remote External Function code.

The Release Remote External Function code accomplishes the following in the peripheral equipment:

(1) The following lines between other computer and the peripheral equipment are disabled:

(a) Input and Output Data Request lines
(b) Interrupt line
(c) All 30 Output Data lines into C register
(d) Input and Output Acknowledge lines.

(2) It provides an enable that allows the Request Control signal from originating computer to enable the following lines between originating computer and the peripheral equipment:

(a) Input and Output Data Request lines
(b) Interrupt line
(c) All 30 Output Data lines into C register
(d) Input and Output Acknowledge lines.

The Control Acknowledge Interrupt is sent to a computer which has requested control of a duplexed peripheral equipment to thereby indicate that the requesting computer is granted control. The interrupt is not sent until the equipment has reached a logical termination point, and other computer has released control as a direct result of a Release Local or Release Remote.

The Control Acknowledged code which is sent with the interrupt consists of a 30-bit data word with one of its positions set to 1. Which position is used depends on the particular unit. After receiving the interrupt, the computer must acknowledge having received control by executing a STORE $C^n$ instruction which generates an Input Acknowledge signal to the peripheral equipment. This Input Acknowledge clears the peripheral equipment interrupt line. Receipt of a Control Acknowledge Interrupt by a computer does not by itself cause immediate communication with a peripheral equipment. It does, however, acknowledge functional control of the equipment by the computer. The computer must transmit additional External Function codes as required by the particular equipment in order to specify the exact manner of data communication. The duplexing logic does not include provision for informing the computers of the transmission or performance of the Release Local and Release Remote External Function codes.

Nonduplexing External Function codes are those required by the peripheral equipment to establish data communications with a computer after the computer has gained control of the peripheral equipment. These External Function codes are not recognized by the peripheral equipment unless originating computer has first obtained control of the equipment by following the correct sequence of the above described External Function codes and Control Acknowledge code evaluation. Nonduplexing External Function codes sent to peripheral equipment containing the duplex feature must always contain zeros in bit-positions 0, 1, and 2. If any of these lower three bits are set to one, the External Function word is interpreted as a "duplex-control" word and the upper 27 bits are completely ignored.

Figure 3:
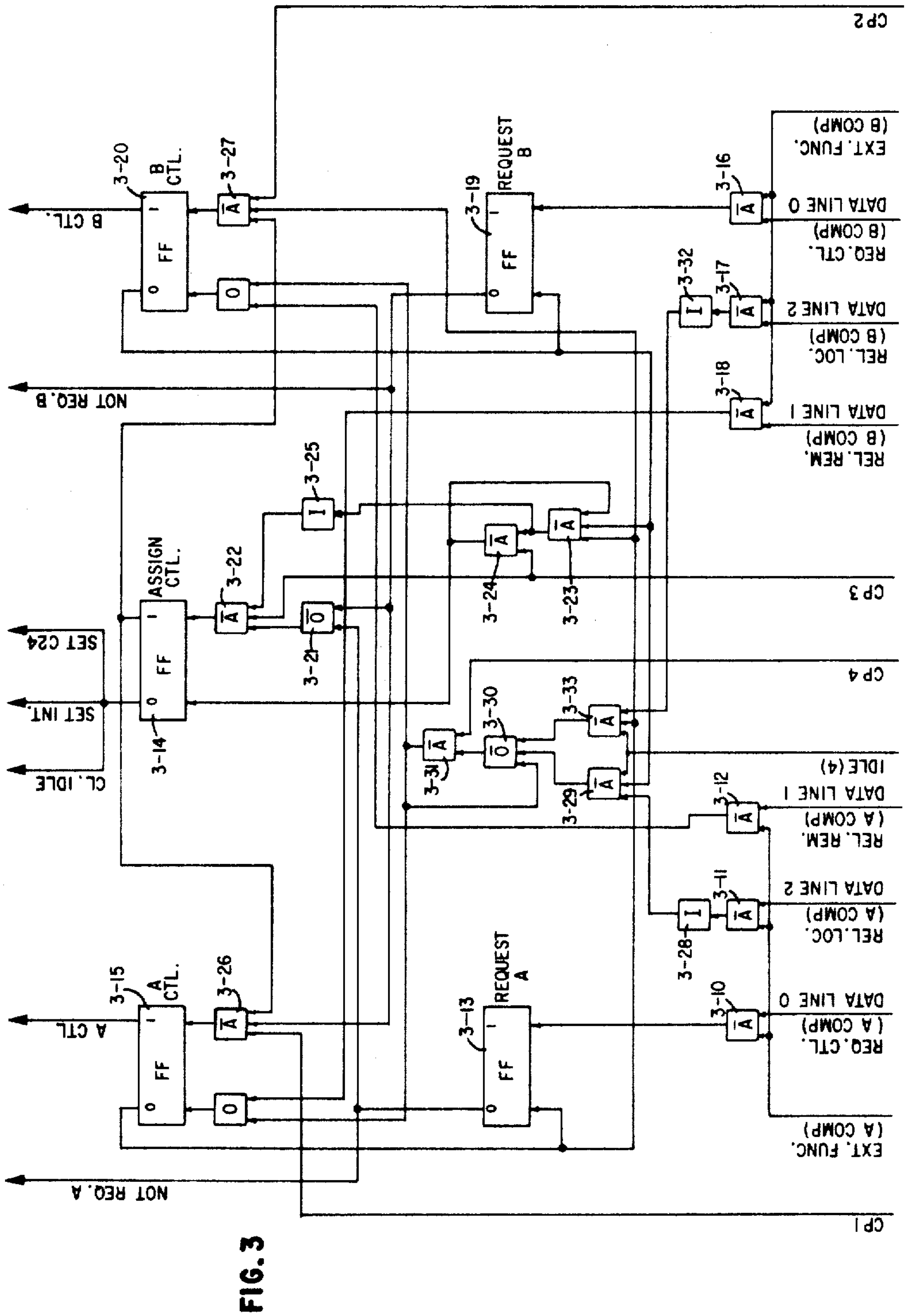
FIGURE 3 is a detailed logical schematic of a part of the duplexing circuit which assigns control to one computer or the other.

FIGURES 3 and 4 show the logic circuits which permit the tape input-output unit of FIGURE 2 to be used with two computers A and B. The logic is designed to allow either computer to take control of the tape unit immediately if it is not in use, or as soon as it is available if it is already under control of the other computer. It is also possible for one computer to take control away from the other if circumstances warrant it (in case of a computer malfunction).

The duplexing logic is governed by bits 0, 1, and 2 of an External Function code word from either computer. Only one of these bits may properly be at a value 1 at any particular time. The three codes represented are listed below:

Bit $2^0=1$ (request control) on Data line 0
Bit $2^1=1$ (release remote) on Data line 1
Bit $2^2=1$ (release local) on Data line 2

In FIGURE 3, A gate 3–10 has one input adapted to receive the bit value appearing on output data line 0 from computer A, which is that data line used for transmitting binary order $2^0$. Consequently, a high signal appearing thereon indicates that computer A is requesting control of the input-output unit. In similar fashion, $\bar{A}$ gate 3–11 is connected to data line 2 from computer A so that when the signal thereon is high, computer A is generating the command Release Local. $\bar{A}$3–12 is connected to data line 1 from computer A which in turn transmits bit values belonging to binary order $2^1$. Therefore, when the External Function code has a 1 binary bit value in this order, the input to $\bar{A}$3–12 is high indicating that computer A is generating the command Release Remote. This group of A gates 3–10 through 3–12 is made responsive to these external function code commands only upon the appearance of a high signal External Function from computer A which in turn indicates that an External Function code word appears on its output data lines. In the absence of the command External Function, any binary bit values ap- appearing on data lines 0 through 29 belong to data words and not to external function code words. For data words, therefore, $\bar{A}$3–10 through 3–12 cannot respond.

When computer A requests control of the external unit, A3–10 outputs a low signal to thereby set FF3–13 which is designated as the Request A flip-flop. FF3–13 in its set state thereby indicates that computer A has made a request for use of the input-output unit, said indication remaining even after the External Function code from computer A disappears from its data output lines. If computer B has use of the unit at the time that computer A requests control, there can be no affirmative response to computer A until after termination of computer B control. At that time, the Assign Control flip-flop 3–14 is set by circuitry subsequently to be described in order to permit the setting of the A Control flip-flop 3–16. This flip-flop when set permits computer A to assume control of the peripheral unit until such a time when said computer transmits an external function code having a 1 bit on data output line 2. At this time, $\bar{A}$3–11 responds to thereby clear FF3–15 by circuitry subsequently described so that the external unit is open to control by computer B if the latter so desires.

$\bar{A}$ gates 3–16 through 3–18 and flips-flops 3–19 and 3–20 perform similar functions for computer B when it requests or has control of the external unit. For example, $\bar{A}$3–16 is responsive to a high signal on output data line 0 from computer B if this bit forms part of an External Function code to thereby set the Request B flip-flop 3–19. This flip-flop in turn causes the setting of the B Control flip-flop 3–20 when the external unit becomes available for control by computer B. A–3–17 is enabled by the appropriate bit in an external function code sent by computer B at the termination of its control. This signal from $\bar{A}$3–17 results in FF3–20 being cleared so that the unit becomes available for control by computer A.

The circuits in FIGURE 4 are used primarily for generating signals which enable the input and output data request lines, the interrupt line, all thirty output data lines to the C register, and the input and output acknowledge lines. For example, if computer A has control of the external unit and sends an external function code specifying that information from the tape unit is to be transmitted to it, then the IDR flip-flop 4–10 is set (via A4–11) whenever the transport control logic of the unit determines that it is ready to begin the read operation from tape. FF4–10 when set permits the subsequent enabling of A–4–12 because of the fact that a high signal A Control appears from FIGURE 3. Consequently, the command Input Data Request is transmitted to computer A to prepare it for receipt of information from the external unit. In somewhat similar fashion, when the external unit is ready to receive data from the controlling computer, for example A, the transport control logic sets the ODR FF4–13 which in turn subsequently permits the enabling of $\bar{A}$4–14 in order that a command Output Data Request be sent to computer A to thereby initiate the transfer. An INT flip-flop 4–15 is also provided in FIGURE 4 which can be set by an appropriate signal from the error detecting circuits whenever the controlling computer must be notified of some malfunction. The setting of FF4–15 causes $\bar{A}$4–16 to generate the command Interrupt which is transmitted to the control in computer so that it branches into an interrupt sub-routine in order to investigate the external unit's malfunction. FF4–15 may also be set by a signal from FIGURE 3 at the time the control is given to a computer in order that said computer can be notified of the fact that its request for control has been granted. This operation will be described in detail in subsequent paragraphs.

$\bar{A}$ gates 4–17, 4–18 and 4–19 generate Interrupt, Input Data Request, and Output Data Request signals, respectively, to computer B in the event that said computer is the one in control of the external unit. For this case, it will be seen that these gates are partially enabled by the command B Control from FIGURE 3 which is produced whenever FF3–20 is set. Consequently, from the above, it may be seen that flip-flops 4–10, 4–13, and 4–15 perform their respective functions irrespective of which computer has control of the external unit, but that control signals developed from the set states of these flip-flops are directed only to one of the two computers.

When a controlling computer, for example A, receives an input data request from the external unit ($\bar{A}$4–12), it prepares its circuits for receipt of information from the external unit and then transmits an Input Acknowledge command back to the external unit signifying that it is ready for the information. $\bar{A}$4–20 responds to such an Input Acknowledge signal from computer A in order to set a Reply flip-flop 4–21. Similarly, when the external unit is ready for receipt of information from Computer A and so generates the output data request signal from $\bar{A}$4–14, computer A puts the data word on its output data lines and responds with an Output Acknowledge signal applied to A4–22 in order to direct the external unit to begin the actual recording function. $\bar{A}$4–22 also sets the Reply flip-flop 4–21. If computer B is the originating computer, then Input Acknowledge and Output Acknowledge signals therefrom to the external unit are received by $\bar{A}$ gates 4–23 and 4–24, respectively, in order to also set the Reply flip-flop.

Information, whether data or external function code words, transmitted from the controlling computer to the external unit is placed into the C register from the data lines associated with the controlling computer. This selection of computer output data lines is made upon the generation of either the A Output Acknowledge Enable signal from $\bar{A}$4–25 or the B Output Acknowledge Enable signal from $\bar{A}$4–26. The enabling of either one of these $\bar{A}$ gates is performed upon the setting of Reply flip-flop 4–21 which in turn indicates that the computer is ready to transmit information to the peripheral unit. Thus, for an output data transfer the controlling computer has its data output lines connected with the C register of the external unit.

FIGURE 4 further shows the remaining control circuits necessary to permit complete operative connection of the controlling computer with the external unit. FF4–27, designated as the Act flip-flop, cooperates with FF4–28 in order to accomplish various timing functions. The Idle FF4–29 is in its set state whenever the external unit is not executing an external function code. FF4–30 when set applies a commond Start Of Function to the transport control logic in order that the execution of the function can be initiated. The cooperation between these flip-flops will be explained in subsequent paragraphs.

FIGURE 5 shows certain ones of the thirty stages making up the C register. Each of the C register stages, of which only C00, C01, C24, and C29 are illustrated, has data input from the A and B computers, as well as from the internal Z register. For example, when information is being transferred from computer A to the external unit, $\overline{A}$4–25 in FIGURE 4 produces a low signal which is inverted via 15–10 and applied to a set of $\overline{A}$ gates 5–11 through 5–40. These $\overline{A}$ gates each individually responds to information appearing on one of the thirty output data lines from computer A in order to place a data word into the C register. In similar fashion, an output from computer B is gated into the C register via a set of $\overline{A}$ gates 5–41 through 5–70 upon enabling a $\overline{A}$4–26 in FIGURE 4. Whenever an input to the controlling computers to be made, information is first transferred from the Z register to the C register via a third set of $\overline{A}$ gates 5–71 through 5–100 upon the generation of the low command Z To C from the transport control logic. Information from the C register is then accepted by the controlling computer via its own individual set of data input lines.

It will further be noted in FIGURE 5 that all three of the commands A Output Acknowledge Enable, B Output Acknowledge Enable, and Z To C are further applied to $\overline{O}$5–101 which in turn produces a high command for any negative input thereto. This high signal is applied to $\overline{A}$5–102 which is clocked at CP3 time in order to first clear all C register stages prior to entry of information therein. $\overline{O}$5–101 is also responsive to the low command Not IDLE, generated when IDLE FF4–29 is set, in order to maintain the C register in a cleared condition.

In addition to being set by information from the computers or from the Z register, stages C24 through C29 are also responsive to information from other sources. In particular, C24 is set to value 1 by the operation of the Assign Control FF3–14 whenever control is granted to a computer. This places a value in the C register which is examined by the computer during a subsequent interrupt routine in order to inform said computer of the fact that it now has control of the external unit. Stages C25 through C29 can each be set also for interrupt routine purposes by inputs from the status register to indicate certain malfunctions of the external unit. Thus, C29 is provided with $\overline{A}$5–103 which, upon the setting of FF4–15, places therein a 1 bit in the event that the error detection circuits have determined an improper condition of the tape unit. However, the function of C stages 25 through 29 as regards error detection does not form a part of the present invention.

Details of the computers are not here shown or described since many prior art general purpose systems possess the programming facility for generating external code words, signals, and the like. Furthermore, the particular manner in which data information in the C register is sent to or received from the tape read/write circuits does not form a part of the present invention. It must be emphasized that other types of peripheral gear besides magnetic tape units can be successfully placed under control of several processors through the use of duplexing circuits here disclosed.

OPERATION

Operation of the present invention will now be described with particular reference to FIGURES 6 and 7. Computers A and B have equal control authority except that, in the unlikely event of both requesting control at the same instant, computer B takes precedence. Three conditions which may exist when a computer originates a duplex code are: A in control, B in control, or neither in control. Codes inappropriate to the conditions are ignored. Duplicate logic, except for the precedence noted above, is provided for codes from computer B and is thus not discussed in detail.

*Response to Request Control sent by computer A—FIGURE 6*

If neither computer is in control, A will gain control immediately, provided that B does not request control simultaneously. The command External Function from Computer A, coupled with a 1 bit on data line 0, enables $\overline{A}$3–10 to set FF3–13. The 0 output from FF3–13 goes low which makes high the output from $\overline{O}$3–21 to thereby provide a partial enable of $\overline{A}$3–22. Since both FF3–15 and FF3–20 are initially assumed to be clear (because neither computer has control at the time the Request Control function code is sent from computer A), their 0 outputs are high and so supply partial enables to $\overline{A}$3–23. $\overline{A}$3–23 also has one high input supplied to it by the output of $\overline{A}$3–24. For clock pulse times CP1, CP2, and CP4, a low signal is applied to one input of $\overline{A}$3–24 which in turn makes this output high and thus enables $\overline{A}$3–23 to produce a low output therefrom. This low output from $\overline{A}$3–23 maintains a high output from $\overline{A}$3–24 even at CP3 time so that these two $\overline{A}$ gates are interconnected and stable in the above-described condition. Consequently, the low output from $\overline{A}$3–23 is inverted via I3–25 to thereby apply a high input to $\overline{A}$3–22. Consequently, when once the output of $\overline{O}$3–21 goes high due to the setting of FF3–13, the next appearing CP3 provides the third high input to $\overline{A}$3–22 and so sets the Assign Control FF3–14. Its 1 output now goes high and is applied both to $\overline{A}$3–26 and $\overline{A}$3–27. Since FF3–19 is at this time clear, $\overline{A}$3–26 is enabled at the next following CP1 to thereby set the A Control flip-flop 3–15. The 0 output of FF3–15 now goes low, thus preventing the enabling of $\overline{A}$3–27 at the next following CP2 time. Furthermore, the low output clears FF3–13 and makes high the output of $\overline{A}$3–23. At the next following CP3, $\overline{A}$3–24 now has applied to it all high inputs which in turn makes low its output to thereby clear FF3–14.

As has been previously mentioned, the granting of control to computer A by the duplexing circuit must be indicated to said computer so that it may commence transmission of further external function code words. This operation is accomplished by using the interrupt circuit of the external unit in the following manner. When FF3–14 is set to thereby apply a partial enable to $\overline{A}$3–26 as described above, its 0 output goes low. This polarity causes C–24 in FIGURE 5 to be set to a value 1. Furthermore, INT FF4–15 is set while Idle FF4–29 is cleared. It will be noted that Idle FF4–29 in its set state has maintained C register in an empty condition via $\overline{O}$5–101 and $\overline{A}$5–102, so that the setting of C24 from FF3–14 places a 1 bit only in this particular C register stage. Furthermore, the simultaneous clearing of FF4–29 prevents C24 from being subsequently cleared of at this 1 value. FF4–15 when set applies a low signal to $\overline{O}$4–31 which in turn makes high its output. This output is inverted via I4–32 and in turn makes high the output of Ō4–33. Since Reply FF4–21 is in its cleared condition, Ā4–34 is enabled at the next following CP2 in order to set Act FF4–27. Ā4–35 now has applied to its high inputs from the 1 output of FF4–27 and the 0 output of FF4–21. A high signal Enable I/O Control is also applied to this Ā gate from the transport control logic in order that its output can go low and thus generate a high output from I4–36. For the purpose of this discussion, this Enable I/O signal may be considered to be continuously applied. Consequently, high signals from I4–36 and the 1 output of FF4–15 will partially enable Ā4–16 and Ā4–17. As soon as FF3–15 is set, Ā4–16 is completely enabled to transmit the command Interrupt to Computer A which in turn interrupts the main program in order that the content of C register can be sampled and stored. Upon receipt by computer A of the C register content, said computer transmits the command Input Acknowledge which is received by Ā4–20. Ā4–20 produces a low output in response to this command since Ō4–31 is also high due to the set condition of FF4–15. The output of Ō4–37 thereupon goes high which, in combination with the command A Control from FIGURE 3, partially enables Ā4–38. Hence, at the next following CP4 time Reply FF4–21 is set which makes high its 1 output. Since FF4–27 is also in a set condition, Ā4–39 is enabled at the next following CP3 in order to set FF4–28. Consequently, at the next following CP4, Ā4–40 is responsive to high inputs from both FF4–28 and FF4–15 to thereupon set Idle FF4–29. Ā4–41 subsequently is enabled at CP1 to clear FF4–27, FF4–21, and FF4–15. At CP2, a low output from I4–42 now clears FF4–28. Thus, all circuits in FIGURE 4 are returned to their initial condition in order to await further external function code words from computer A.

If computer B is in control when A requests control, the request is stored until B completes its function and releases control. The Request A flip-flop 3–13 is set as before, but Assign Control FF3–14 cannot be set for lack of an enable from Ā3–23. Thus, if B control FF3–20 is in its set condition at the time that computer A requests control, a low signal is being applied to Ā3–23 from the 0 output of FF3–20. Consequently, I3–25 also applies a low input to Ā3–22 which prevents this gate from setting FF3–14. The request for control by computer A will thereupon remain stored until computer B terminates its control by clearing FF3–20. The request stored in FF3–13 will then be carried through to completion, just as described in the preceding paragraphs. If computer A requests control when it already has control, the code is ignored. As long as FF3–15 is set, it holds FF3–13 in the clear state and prevents any change in the duplexer circuits. It should further be noted that if the duplexer is simultaneously requested by both A and B for control, then both FF3–13 and FF3–19 are set. In this case, Ā3–26 cannot be enabled at CP1 time due to the fact that a low signal is applied thereto from the 0 output of FF3–19. Consequently, since FF3–15 remains clear, its 0 output continues to apply a high signal to Ā3–27 which can be enabled at the next following CP2 time to thereby set FF3–20. It will therefore be seen that control is first given to computer B over computer A if both request use of the external unit at the same time. After computer B has finished with the external unit, it will clear FF3–20 to thereby effect a change of control to computer A as represented by the continued set condition of FF3–13.

*Start of Function sequence—FIGURE 7*

When computer A has control of the peripheral unit, but has not yet specified a function for it to perform, the Request A FF3–13 is clear and Idle FF4–29 is set. These flip-flop conditions partially enable Ā4–43. To perform a read, write, or rewind function, computer A must put the appropriate external function code on its output data lines while simultaneously applying a high signal to its External Function input line to the duplexer. For such a high External Function signal from computer A, Ā4–43 is thereupon fully enabled to make low its output which in turn makes high the output of Ō4–37. Since FF3–15 is in its set condition, Ā4–38 is enabled at the next following CP4 to set Reply FF4–21. Ā4–44 is now enabled at the next following CP2 to set FF4–30 and FF4–27. Since both Act FF4–27 and Reply 4–21 are now set, Ā4–25 is enabled to gate the information appearing on the data output lines from computer A (said information being the external function code word which accompanies the External Function signal to Ā4–43) into the C register. It will be noted that Ā4–25 can be enabled at this time due to the high command A Control and the high output appearing from I4–32, due to the fact that both FF4–15 and FF4–10 are in their clear condition. The set conditions of the Reply and Act flip-flops also permit the enabling of Ā4–39 at the next following CP3 to set FF4–28. Ā4–41 now operates at the next following CP1 to clear flip-flops 4–27 and 4–21, as well as FF4–30.

Just prior to the clearing of FF4–30 by the output from Ā4–41, Ā4–45 is enabled at CP4 to generate the command Start Of Function. This command clears the Idle flip-flop 4–29. It is also transmitted to the transport control logic in order to start preparation for the performance of the function defined by the external function code word in register C. Assume here that this external function code requires a thirty-bit word to be transmitted from computer A to the peripheral unit where it is written on tape transport 1. The Start Of Function command from Ā4–45 permits the decoding of the function word and preparation of tape transport 1 for receipt of this information. As soon as tape transport 1 indicates that it is ready to begin a write cycle, the transport logic generates a command Set ODR which sets FF4–13. Its 0 output now goes low which in turn makes high the output from Ō4–33, thus enabling Ā4–34 at the next following CP2 time. The output from Ā4–34 in turn sets Act FF4–27 which now makes low the output of Ā4–35. I4–36 inverts this output and thus enables Ā4–14 to generate a command Output Data Request to computer A. This command informs computer A that the peripheral unit is ready to receive the data word to be written on the tape. When computer A places this data word on its output data lines, it returns an Output Acknowledge command to Ā4–22 which is enabled at this time because of the still set condition of FF4–13. Consequently, at the next following CP4, Ā4–38 sets Reply FF4–21. Act FF4–27 has remained set so that now Ā4–25 is enabled to gate the data word appearing on the computer A output data lines into C register from whence it will be written on the tape at transport 1.

At CP3 next following the setting of FF4–21, Ā4–39 is enabled to set FF4–28. This in turn permits enabling of Ā4–41 at the next following CP1 to clear the Act, Reply and ODR flip-flops. The inverted CP2 clears FF4–28 and the FIGURE 4 circuits are now returned to their initial condition with the exception of Idle FF4–29. Idle FF remains clear until after the data word in C register has been written on the tape, whereupon the transport control logic generates a Master Clear signal which again sets FF4–29. This set condition of FF4–29 now permits Ā4–43 to once again accept a new external function word from computer A.

*Response to Release Local and Remote codes sent by computer A*

The Release Local code from computer A is effective only if A is in control of the peripheral unit and if the unit is not still executing some external function code previously sent to it by the computer. The Release Local code word has a 1 bit on data line 2 which is detected by $\overline{\text{A}}$3–11 upon its enabling by the simultaneously transmitted command External Function. I3–28 inverts the low output applied thereto in order to partially enable $\overline{\text{A}}$3–29. Since computer A is assumed to have control in this discussion, FF3–20 is clear so that its 0 output also applies a high input to $\overline{\text{A}}$3–29. Consequently, if the external unit is not executing some previously transmitted function, Idle FF4–29 is set in order to fully enable $\overline{\text{A}}$3–29 into generating a low output therefrom. On the other hand, if the external unit is still in the process of executing some function at the time that the Release Local code is transmitted to it from computer A, then Idle FF4–29 is in its clear condition, thus preventing a significant output from $\overline{\text{A}}$3–29. Computer A maintains the Release Local code on its data output lines so that when FF4–29 is set at the conclusion of execution, $\overline{\text{A}}$3–29 can be enabled.

The enabling of $\overline{\text{A}}$3–29 makes high the output of $\overline{\text{O}}$3–30. Consequently, the next following CP4 enables $\overline{\text{A}}$3–31 which in turn clears A Control FF3–15. The duplexer is now in neutral and ready for a control request from either computer A or computer B. From the above it can be seen that if B is in control, or if the Idle flip-flop is clear (indicating the unit to be busy), then $\overline{\text{A}}$3–11 cannot be enabled and the code is thus ignored. If the duplexer is already in neutral, a Release Local code from computer A is performed but accomplishes nothing.

If computer B is in control of the peripheral unit and computer A transmits a Release Remote code word via its output data lines, then $\overline{\text{A}}$3–12 is enabled by the 1 bit appearing on data line 1. This output immediately clears B control FF3–20 even if the external unit were in the middle of executing a computer B external function code word. If a Release Remote code from computer A has been preceded by a Request Control from A (which is stored by FF3–13), then A takes control of the unit in the usual way as soon as the Release Remote code clears FF3–20.

While one preferred embodiment of the invention has been shown in connection with a particular kind of peripheral unit, i.e. magnetic tape, it is to be understood that various modifications can be made thereto without departing from its novel principles as defined in the appended claims.

We claim:

1. In an arrangement for selectively completing one of at least two communication links each connected between a peripheral unit and a different one of at least two data processing means each of which in turn can asynchronously originate a control indication requesting communication by it with the peripheral unit, the invention comprising:

(a) a group of first means each individually receiving and storing a control indication from a different data processing means;

(b) a group of second means each individually actuable to thereby specify communication between the peripheral unit and a different data processing means;

(c) control means responsive to the concurrence of a control indication stored in any said first means and signals representing that all of said second means are unactuated to thereby actuate a said second means which specifies communication with the data processing means originating said last named control indication; and (d) a group of third means each individually responsive to a different actuated second means for operatively completing the communication link between the peripheral unit and a different data processing means specified by said last named different actuated second means.

2. The invention according to claim 1 wherein said control means includes a priority circuit which is responsive to only one of any number of concurrently stored control indications in order to actuate only one second means at a time.

3. The invention according to claim 1 wherein said control means further includes means responsive to an actuated second means for clearing a control indication from the associated first means.

4. The invention according to claim 1 wherein there is further provided second control means responsive to the actuation of a said second means for generating an acknowledge indication which is transmitted to the data processing means whose communication link is now completed.

5. The invention according to claim 4 wherein said control means includes a priority circuit which is responsive to only one of any number of concurrently stored control indications in order to actuate only one second means at a time.

6. In an arrangement for selectively completing one of at least two communication links each connected between a peripheral unit and a different one of at least two data processing means each of which in turn can asynchronously originate a first control indication requesting communication by it with the peripheral unit and a second control indication relinquishing communication by it with the peripheral unit, the invention comprising:

(a) a group of first means each individually receiving and storing a first control indication from a different data processing means;

(b) a group of second means each individually actuable to thereby specify communication between the peripheral unit and a different data processing means;

(c) first control means responsive to the concurrence of a first control indication stored in any said first means and signals representing that all of said second means are unactuated to thereby actuate a said second means which specifies communication with the data processing means originating said last named first control indication;

(d) a group of third means each individually responsive to a different actuated second means for operatively completing the communication link between the peripheral unit and a different data processing means specified by said last named different actuated second means; and (e) second control means responsive to a second control indication from a data processing means, whose communication link is complete for returning the single actuated second means to an unactuated state.

7. The invention according to claim 6 wherein said first control means includes a priority circuit which is responsive to only one of any number of concurrently stored first control indications in order to actuate only one said second means at a time.

8. The invention according to claim 6 wherein said first control means further includes means responsive to an actuated second means for clearing a first control indication from the associated first means.

9. The invention according to claim 6 wherein there is further provided third control means responsive to the actuation of a said second means for generating an acknowledge indication which is transmitted to the data processing means whose communication link is now completed.

10. In an arrangement for selectively completing one of at least two communication links each connected between a peripheral unit and a different one of at least two data processing means each of which in turn can asynchronously originate a first control indication requesting communication by it with the peripheral unit, a second control indication relinquishing communication by it with the peripheral unit, and a third control indication relinquishing communication by a different data processing means with the peripheral unit, the invention comprising:

(a) a group of first means each individually receiving and storing a first control indication from a different data processing means;

(b) a group of second means each individually actuable to thereby specify communication between the peripheral unit and a different data processing means;

(c) first control means responsive to the concurrence of a first control indication stored in any said first means and signals representing that all of said second means are unactuated to thereby actuate a said second means which specifies communication with the data processing means originating said last named first control indication;

(d) a group of third means each individually responsive to a different actuated second means for operatively completing the communication link between the peripheral unit and a different data processing means specified by said last named different actuated second means;

(e) second control means responsive to a second control indication from a data processing means, whose communication link is complete, for returning the single actuated second means to an unactuated state; and (f) third control means responsive to a third control indication from a data processing means, whose communication link is incomplete, for returning any actuated second means to an unactuated state.

11. The invention according to claim 10 wherein said irst control means includes a priority circuit which is esponsive to only one of any number of concurrently tored control indications in order to actuate only one of said second means at a time.

12. The invention according to claim 10 wherein said irst control means further includes means responsive to in actuated second means for clearing a control indication from the associated first means.

13. The invention according to claim 10 wherein there s further provided fourth control means responsive to the ctuation of a said second means for generating an acknowledge indication which is transmitted to the data processing means whose communication link is now completed.

14. In an arrangement for selectively completing only one of first and second comunication links each between a peripheral unit and a first and second data processing means, respectively each of which in turn can asynchronously originate first and second control signals, respectively, requesting communication by it with the peripheral unit, the invention comprising:

(a) first and second bistable elements each of which can be individually switched from a clear state to a set state by said first and second control signals, respectively;

(b) third and fourth bistable elements each of which has a clear state and a set state;

(c) first control circuit means responsive to the first element set state and the fourth element clear state for switching said third element from its clear state to its set state;

(d) second control circuit means responsive to the second element set state and the third element clear state for switching said fourth element from its clear state to its set state; and (e) first and second gating means individually responsive to the third element set state and the fourth element set state, respectively, for completing said first and second communication links, respectively.

15. The invention according to claim 14 wherein further means is provided responsive to the second element set state for inhibiting operation of said first control circuit means.

16. The invention according to claim 14 wherein a first feedback connection is provided between said third element said first element such that the set state of the former maintains the latter in the clear state, and a second feedback connection is provided between said fourth element and said second element such that the set state of the former maintains the latter in its clear state.

17. The invention according to claim 16 wherein further means is provided responsive to the second element set state for inhibiting operation of said first control circuit means.

18. In an arrangement for selectively completing only one of first and second communication links each between a peripheral unit and a first and second data processing means, respectively, each of which in turn can asynchronously originate first and second control signals, respectively, requesting communication by it with the peripheral unit, the invention comprising:

(a) first and second bistable elements each of which can be individually switched from a clear state to a set state by said first and second control signals, respectively;

(b) third and fourth bistable elements each of which has a clear state and a set state;

(c) a fifth bistable element which has a clear state and a set state;

(d) first control circuit means responsive at a first enabling time to the first element set state or the second element set state when either exists concurrenly with both the third and fourth element clear states, for switching said fifth element from its clear state to its set state;

(e) second control means responsive at a subsequent second enabling time to the fifth element set state and the second element clear state for switching said third element from its clear state to its set state;

(f) third control means responsive at a subsequent third enabling time to the fifth element set state and the third element clear state for switching said fourh element from its clear state to its set state; and (g) first and second gating means individually responsive to the third element set state and the fourth element set state, respectively, for compleing said first and second communicaion links, respectively.

19. The invention according to claim 18 wherein a first feedback connection is provided between said third element and said first element such that the set state of the former maintains the latter in its clear state, and a second feedback connection is provided between said fourth element and said second element such that the set state of the former maintains the latter in its clear state.

20. In an arrangement for selectively completing only one of first and second communication links each between a peripheral unit and first and second data processing means, respectively, each of which in turn can asynchronously originate first and second control signals, respectively, requesting communication by it with the peripheral unit, and can also asynchronously originate third and fourth control signals, respectively, relinquishing communication by it with the peripheral unit, the invention comprising:

(a) first and second bistable elements each of which can be individually switched from a clear state to a set state by said first and second control signals, respectively;

(b) third and fourth bistable elements each of which has a clear state and a set state;

(c) first control circuit means responsive to the first element set state and the fourth element clear state for switching said third element from its clear state to its set state;

(d) second control circuit means responsive to the second element set state and the third element clear state for switching said fourth element from its clear state to its set state;

(e) first and second gating means individually responsive to the third element set state and the fourth element set state, respectively, for completing said first and second communication links, respectively; and (f) third gating means responsive to either a third or fourth control signal, respectively, for switching said third element from a set state to a clear state and said fourth element from a set state to a clear state, respectively.

21. The invention according to claim 20 wherein a first feedback connection is provided between said third element and said first element such that the set state of the former maintains the latter in its clear state, and a second feed back connection is provided between said fourth element and said second element such that the set state of the former maintains the latter in its clear state.

22. In an arrangement for selectively completing only one of first and second communication links each between a peripheral unit and first and second data processing means, respectively, each of which in turn can asynchronously originate first and second control signals, respectively, requesting communication by it with the peripheral unit, and can also asynchronously originate third and fourth control signals, respectively, relinquishing communication by it with the peripheral unit, the invention comprising:

(a) first and second bistable elements of each of which can be individually switched from a clear state to a set state by said first and second control signals, respectively;

(b) third and fourth bistable elements each of which has a clear state and a set state;

(c) a fifth bistable element which has a clear state and a set state;

(d) first control circuit means responsive at a first enabling time to the first element set state or the second element set state when either exists concurrently with both the third and fourth element clear states for switching said fifth element from its clear state to its set state;

(e) second control means responsive at a subsequent second enabling time to the fifth element set state and the second element clear state for switching said third element from its clear state to its set state;

(f) third control means responsive at a subsequent third enabling time to the fifth element set state and the third element clear state for switching said fourth element from its clear state to its set state;

(g) first and second gating means individually responsive to the third element set state and the fourth element set state, respectively, for completing said first and second communication links, respectively; and (h) third gating means responsive to either a third or fourth control signal, respectively, for switching said third element from a set state to a clear state and said fourth element from a set state to a clear state, respectively.

23. The invention according to claim 22 wherein a first feedback connection is provided between said third element and said first element such that the set state of the former maintains the latter in its clear state, and a second feedback connection is provided between said element and said second element such that the set state of the former maintains the latter in its clear state.

References Cited by the Applicant

UNITED STATES PATENTS

| | | | |
|---|---|---|---|
| 3,029,414 | 4/62 | Schrimpf | 340—172.5 |
| 3,061,192 | 10/62 | Terzian | 235—157 |

OTHER REFERENCES

Chao: "The System Organization of MOBIDIC B," Proceeding of the Eastern Joint Computer Conference, pages 101–107, December 1959.

ROBERT C. BAILEY, *Primary Examiner.*

MALCOLM A. MORRISON, *Examiner.*